Sept. 29, 1953  W. REINHARD  2,654,050
SAW-TOOTH WAVE GENERATOR
Filed June 6, 1951

INVENTOR
WOLFGANG REINHARD
BY Philip M. Bolton
ATTORNEY

Patented Sept. 29, 1953

2,654,050

UNITED STATES PATENT OFFICE 2,654,050

SAW-TOOTH WAVE GENERATOR

Wolfgang Reinhard, Pforzheim, Germany, assignor to International Standard Electric Corporation, New York, N. Y., a corporation of Delaware Application June 6, 1951, Serial No. 230,098
In Germany June 24, 1950

1 Claim. (Cl. 315—27)

The present invention relates to a circuit arrangement for generating saw-tooth currents such as are used for energizing the deflection coils of television or other cathode-ray tubes. More particularly the invention relates to a saw-tooth current generator in which a saw-tooth voltage, produced by slowly charging a condenser and rapidly discharging it, or vice versa, is fed to the grid of a tube, to the plate circuit of which the deflection coils are coupled either directly or through a transformer. Circuit arrangements of this type are most advantageous in cases where the time constant of the deflection coil is small compared to the period of the saw-tooth wave; as, for example, in television vertical deflection circuits.

A saw-tooth wave obtained in this manner has a certain curvature, even when the condenser voltage is linear. This curvature results from curvature of the tube characteristic and also from the inductance of the output transformer, which is connected across the deflection coil. The current flowing through the deflection coil resistance will have a saw-tooth shape, and a corresponding saw-tooth voltage $u_L$ will be present across the transformer, through which, therefore, a parabolic current $i_L$ must flow, for since $$i_L = \frac{1}{L}\int u_L dt$$

if $u_L$ is proportional to $t$, $i_L$ must be proportional to $t^2$. Thus, the output tube must produce a composite current which is definitely not sawtoothed but which may have a minimum within the rise time of the saw-tooth current depending on the relation of the amplitudes of the sawtooth and the parabolic currents. In fact, if the transformer is efficiently designed, a minimum must occur. The control voltage on the grid of the tube must therefore also be considerably different from a linear saw-tooth voltage. The method of reducing the effect of tube characteristic curvature and of the transformer by using inverse or negative voltage feedback is known to the art. For example, a winding may be added to the transformer to which the deflecting coils are connected, and this winding may be inserted between the grid of the tube and the charging condenser. Every change in the coil voltage will then be reproduced on the grid through the inverse feedback winding with such a polarity as to oppose the original voltage; in other words, the internal resistance of the circuit is decreased. If $u_s$ represents the coil voltage looking from the primary side of the transformer, $u_c$ the condenser voltage, $k$ the negative feedback factor, and $v$ the gain, we may write the following relationship:

$$u_s = v(u_c - k.u_s)$$

which becomes:

$$U_s = \frac{u_c}{k}\frac{1}{1+\frac{1}{v.k}}; \text{ or } U_s \approx \frac{u_c}{k}\left(1-\frac{1}{v.k}\right)$$

It is seen from this that when $v.k \gg 1$, the coil voltage depends almost solely on the condenser voltage and that with a linearly increasing condenser voltage an almost linearly increasing deflection current is obtained.

However, one drawback of this inverse voltage feedback is the small internal resistance of the circuit. The deflection coil inductance offers a certain amount of opposition to the rapid return of the deflection current, which must complete its retrace in about 5% of the time taken for the trace. This effect is more pronounced when the ohmic resistance in series with the inductance is lower, and hence when the time constant $L/R$ is greater. In order to make sure that the retrace will take place within the specified time it is therefore necessary to add a pulse voltage to the deflecting coils or the grid of the amplifier feeding said coils.

In order to overcome this difficulty, it is proposed, according to the invention, not to make the negative feedback dependent on the voltage of the deflecting coils but rather to make the feedback voltage vary proportionally to the deflecting coil current.

Accordingly, a primary object of the present invention is the generation of linear sawtooth currents having a short retrace period.

Another object of the invention is to linearize the output of a saw-tooth current generator without increasing the time constant of said generator.

Another object of the invention is to provide an energizing circuit for deflection coils of a cathode ray tube, in which circuit non-linearities of both the saw-tooth current for said deflection coils and of the saw-tooth driving voltage are compensated.

Other objects and advantages of the invention will become apparent from the following description of particular embodiments thereof illustrated in the drawing, wherein.

Figure 1:
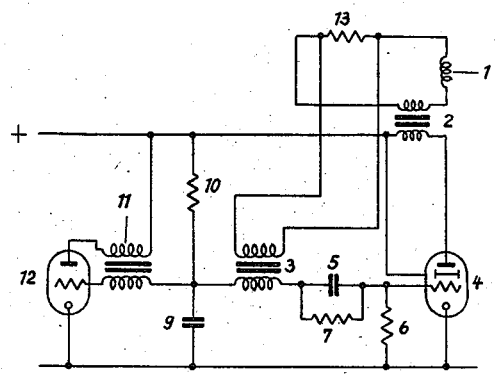
Fig. 1 is a circuit diagram of one embodiment of the invention.

Various examples of the invention are shown in the several figures of the drawing. In all of the figures the reference numeral 1 denotes the deflection coils; numeral 2, the output transformer; 4, the amplifier tube; 5, the coupling condenser; 6, the grid-leak resistor; 7, a resistor across the coupling condenser; 9, the charging condenser; 10, the load resistor; 11, the blocking-oscillator transformer, and 12, the blocking-oscillator tube. Condenser 9, resistor 10, transformer 11, and tube 12 make up a well-known blocking oscillator arrangement, in which the condenser periodically undergoes a slow discharge of a negative potential thereon and is then charged negatively again by the grid current. Resistors 6 and 7 form a voltage divider that makes possible the correct location of the operating point of tube 4.

In Fig. 1 the inverse-feedback voltage, which, according to the invention, is proportional to the deflection current, is produced by connecting in series with the deflecting coils 1 a resistor 13, across which is connected the primary winding of the feedback transformer. In this manner, the following advantages are obtained. The feedback voltage is no longer a function of the voltage on the deflecting coils but rather of the current passing through the latter, i. e., a change in coil voltage causes practically no change in coil current. The internal resistance of the circuit is thus increased. This, however, decreases the effective time constant of the deflecting coils, so that the deflection current can be made to complete its return within the prescribed retrace time without need of introducing any additional pulse voltage. The disadvantage of this arrangement is that the inverse-feedback voltage becomes very small because the ohmic resistance of the deflecting coils is very small and the series resistor 13 must accordingly be chosen small.

Figure 2:
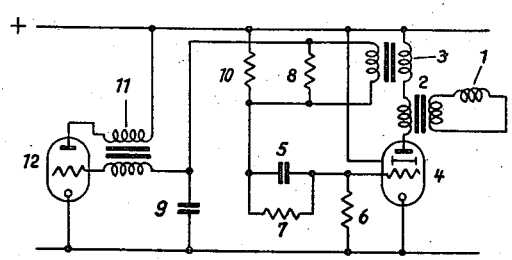
Figs. 2 and 3 show embodiments of the invention providing compensation for both the sawtooth voltage and saw-tooth current.

Fig. 2 shows an arrangement in which an inverse-feedback voltage proportional to the deflection current is obtained through the use of an additional transformer 3, having its primary winding connected in series with that of the output transformer 2. In order for the feedback transformer 3 to have the same linearizing effect during the entire trace, its voltage must vary in the same way as the voltage on the deflecting coils. This is accomplished by connecting in parallel with the secondary winding of transformer 3, a resistance 8, which, together with the inductance of the secondary winding, gives the same time constant as the resistance of the deflecting coils 1 taken together with the inductance of the parallel-connected transformer 2.

The effective voltage on the grid of tube 4, Fig. 2, is proportional to the sum of the voltage across condenser 9 and the voltage developed in the secondary winding of transformer 3, which is of such a polarity as to oppose the condenser voltage.

The rate of change of the voltage on condenser 9 is $$du_c/dt = i/c$$

and therefore it is dependent on the charging current $i$. This current, in turn, depends on the voltage across charging resistor 10. In order to minimize the variations in this voltage, thus making the voltage on the condenser 9 as linear as possible, it is further proposed, as shown in Fig. 2, to insert the secondary winding of transformer 3 between charging condenser 9 and the charging resistor 10, for then the lower end of resistor 10 will be at a point whose potential changes substantially less.

Figure 3:
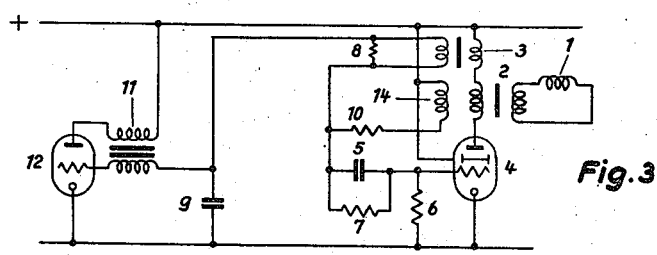

In order to eliminate any remaining nonlinearity when a smaller feedback factor is used, it is further possible, as shown in Fig. 3, to insert a winding 14 between the charging resistor 10 and the plate potential line. Winding 14 is coupled to one of the transformers in the plate circuit of tube 4, for example output transformer 2, and is so designed and polarized that the voltage on charging resistor 10 is approximately constant. In other respects, the circuit of Fig. 3 is similar to that of Fig. 2 and hence needs no further description.

Figure 4:
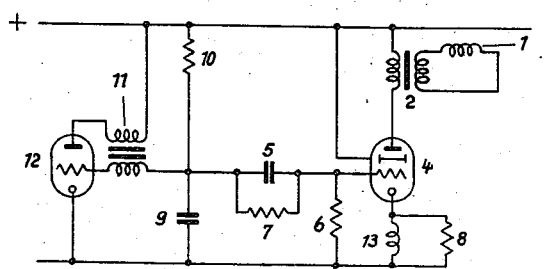
Fig. 4 shows still another embodiment of the invention in which the compensating circuit is in the cathode circuit of the current amplifier.

Instead of feedback transformer 3 of Figs. 2 and 3, a coil 13 can be connected in the cathode circuit of tube 4, with a resistor 8 bridged thereacross, as shown in Fig. 4. The time constant of the circuit made up of coil 13 and resistor 8 is again made equal to the time constant of the resistance of the deflection coils and the parallel inductance of transformer 2. It will be understood that the elements 8 and 13, being common to the grid and plate circuits of tube 4, provide a degenerative feedback voltage from the plate circuit to the control grid or input circuit of tube 4. This feedback voltage will vary with the plate current of tube 4, and will be substantially proportional to the current through deflection coil 1, since the circuit 8, 13 has the same time constant as the deflection coil circuit. Other portions of the circuit shown in Fig. 4, being similar to the circuits of Figs. 1 to 3, need not be described again.

It will be obvious to those skilled in the art that various changes may be made in the embodiments of the invention described herein. It will be apparent, for example, that the negative feedback circuits shown in the several figures of the drawing may be substituted one for another, or may be incorporated in the same circuit. It will also be apparent that any suitable source of sawtooth voltage may be used in place of the blocking oscillator circuit shown herein and that other modifications of the circuits illustrated and described herein may be made without departing from the principles of my invention as set forth in the claim.

I claim:

A generator of sawtooth current waves comprising means for generating a sawtooth voltage, said means including a charging circuit having a resistor and condenser connected in series, an electron tube having a control grid, cathode and anode, an input circuit connecting said control grid and cathode across said condenser, an output transformer and an inverse feedback transformer having primary windings connected in series in the anode circuit of said tube, a cathode ray tube deflection coil connected across the secondary winding of said output transformer, the secondary winding of said inverse feedback transformer being connected in said input circuit and in series with said resistor and condenser of said charging circuit, a resistor connected in parallel with said last named winding and forming therewith a circuit having a time constant substantially equal to the time constant of the circuit formed by the deflection coil and the secondary winding of the output transformer.

WOLFGANG REINHARD.

References Cited in the file of this patent

UNITED STATES PATENTS

| Number | Name | Date |
|---|---|---|
| 2,280,990 | White | Apr. 28, 1942 |
| 2,284,378 | Dome | May 26, 1942 |
| 2,443,030 | Foster | June 8, 1948 |
| 2,445,017 | Boadle | July 13, 1948 |
| 2,466,784 | Schade | Apr. 12, 1949 |
| 2,467,699 | Richards | Apr. 19, 1949 |
| 2,471,819 | Kerkhof | May 31, 1949 |
| 2,473,983 | Wolf | June 21, 1949 |
| 2,482,150 | Bocciarelli | Sept. 20, 1949 |
| 2,503,745 | Kerkhof | Apr. 11, 1950 |
| 2,521,158 | Gannaway et al. | Sept. 5, 1950 |
| 2,543,305 | Schwarz | Feb. 27, 1951 |
| 2,545,346 | Edelsohn | Mar. 13, 1951 |
| 2,553,360 | Court | May 15, 1951 |
| 2,561,586 | Montgomery | July 24, 1951 |
| 2,561,817 | Parker | July 24, 1951 |
| 2,563,487 | Reeves | Aug. 7, 1951 |
| 2,574,245 | Court | Nov. 6, 1951 |